Patented June 2, 1942

2,284,637

UNITED STATES PATENT OFFICE 2,284,637

POLYMERIC CARBAMATES AND THEIR PREPARATION

Willard E. Catlin, Wilmington, Del., assignor to E. I. du Pont de Nemours & Company, Wilmington, Del., a corporation of Delaware No Drawing. Application September 29, 1938, Serial No. 232,467

13 Claims. (Cl. 260—2)

This invention relates to synthetic polymeric materials and more particularly to synthetic linear polymers.

In Patents 2,071,250 and 2,071,253 there are described synthetic fiber-forming polymers obtained from several types of bifunctional reactants. The preparation of these fiber-forming polymers, the most valuable of which are the polyamides obtainable by reacting diamines with dibasic acids or by polymerizing polymerizable monoaminomonocarboxylic acids, usually involves evolution and removal of by-products, and requires high temperatures and/or long heating.

This invention has as an object a method for preparing linear polymers which does not involve the formation of by-products and which may be conducted at relatively low temperatures and with short periods of heating. A further object is the production of new and useful polymers. A still further object is the preparation of new linear polymers useful in the manufacture of fibers. Other objects will appear hereinafter.

These objects are accomplished by reacting a diisocyanate or a diisothiocyanate of the formula XCNRNCX, in which R is an organic radical and X is oxygen or sulfur, with a diol, that is, a compound of the formula HXR'XH, in which R' is an organic radical and X is oxygen or sulfur. Although the reaction of mono- and polyhydric alcohols with monoisocyanates is known, and in a few instances the reaction of monohydric alcohols with diisocyanates and diisothiocyanates has been reported, the products described herein are, insofar as I am aware, new.

In carrying out my invention, substantially chemically equivalent quantities of a dihydric alcohol, a dithiol, or a dihydric phenol, and a diisocyanate or diisothiocyanate are reacted at such a temperature and for such a length of time that a degree of polymerization is attained resulting in a polymer having the desired properties. I prefer to operate by mixing the reactants at room temperature and warming until a homogeneous solution is formed. This solution is then heated at some moderate temperature, e. g. 90° C. to 170° C., preferably until solidification of the polymer takes place. The polymer is then heated for two to seven hours at temperatures above its melting point or for two to sixteen hours at temperatures below its melting point until the desired degree of polymerization is attained. For the polymerization, temperatures as low as 90° C. can be used, and it has not been found necessary to exceed 250° C. All heating may be done in an open vessel but it is preferably done in an inert atmosphere such as nitrogen. An inert solvent such as toluene may be employed if desired. The reaction may be conducted under either atmospheric or reduced pressures.

The reaction involved may be represented as follows:

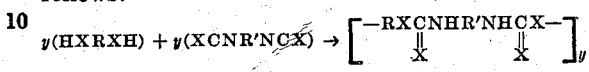

wherein R and R' are divalent organic radicals which may be the same or different and X is a member of the class consisting of oxygen and sulfur, and $y$ is the number of units in the polymer chain. For the accomplishment of this invention neither R nor R' should have attached any functional groups, other than those indicated in the above equation, which would react under the conditions of polymerization with the isocyanate or isothiocyanate groups, such as primary or secondary amino groups, or which would react under the polymerization conditions with the hydroxyl or thiol groups, such as acid halides.

Polymeric carbamates and thiocarbamates formed by this reaction are for the most part characterized by moderately high melting points, generally above 100° C., are microcrystalline in character, and are in general soluble in phenols, glacial acetic acid, and ethylene chlorohydrin. Filaments formed from these polymers are capable of being cold drawn into oriented fibers, that is, the filaments upon application of tensile stress in the solid state yield fibers which upon X-ray examination exhibit molecular orientation along the fiber axis. Polymeric carbamates and thiocarbamates generally begin to exhibit fiber-forming properties when the reaction by which they are prepared has proceeded sufficiently far to yield polymers showing an intrinsic viscosity of 0.2 wherein intrinsic viscosity (a measure of molecular weight) is defined as $$\frac{\log_e \eta_r}{C}$$

where $\eta_r$ is the viscosity of a dilute m-cresol solution of the polymer divided by the viscosity of m-cresol in the same units and at the same temperature and C is the concentration in grams of polymer per 100 cc. of the solution. However, polymers of intrinsic viscosity of less than 0.2 sometimes exhibit fiber-forming properties. Upon hydrolysis with mineral acids, for example, hydrochloric acid, the polymeric carbamates and thiocarbamates revert to the corresponding bifunctional diols or dithiols from which they are formed, the diamines in the form of their salts from which the corresponding bifunctional carbamate-forming diisocyanates or diisothiocyanates may be derived, and carbon dioxide or carbon disulfide.

The following examples, in which the quantities of reagents are parts by weight, are illustrative of the above method for preparing linear polymers containing the recurring carbamate or thiocarbamate linkages

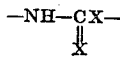

where X is oxygen or sulfur.

Example I

Decamethylene diisocyanate is prepared by dissolving 86 parts of decamethylenediamine in 1155 parts of warm xylene to which is added 36.5 parts of dry hydrogen chloride. The suspension of decamethylenediamine dihydrochloride is heated to boiling, a small additional amount of hydrogen chloride is added, and the suspension is heated at reflux while a slow stream of dried phosgene is passed into the liquid. When most of the solid is dissolved, the solution is filtered, the xylene is removed under reduced pressure, and the remainder is distilled twice, giving 75 parts of decamethylene diisocyanate boiling at 151°–153° C. at 3 mm. pressure.

To 54.98 parts of decamethylene glycol is added 70.75 parts of decamethylene diisocyanate in an atmosphere of dry nitrogen. These, when warmed at 100° C., form two immiscible layers which become a homogeneous solution and solidify after ten minutes. The polymer is colorless, brittle, and granular. It melts at 138° C., has an intrinsic viscosity, as determined in m-cresol, of 0.38, and when molten, can be drawn out to a filament by touching the molten mass with a cold rod and withdrawing the rod. Under 2000 lbs./sq. in. pressure at 148° C., the polymer can be pressed to thin, pliable sheeting. Both the filaments and the sheeting can be cold drawn.

Example II

To 17.52 parts of decamethylene glycol is added 22.55 parts of decamethylene diisocyanate in an atmosphere of dry nitrogen. The mixture is heated at 95°–105° C. with agitation until a homogeneous solution is formed. The reaction mass is heated a total of two hours at 95°–105° C. The polymer solidifies during this time, and is then heated for two hours at 200° C. in the molten state. When cooled, the polymer is a light-colored, waxy product which melts at 145° C. and has an intrinsic viscosity, as determined in m-cresol, of 0.60 and is soluble in hot butanol-1, glacial acetic acid, toluene, xylene, chlorobenzene, ethylene chlorohydrin, and cyclohexanol.

Anal. Calc'd. for $C_{22}H_{42}O_4N_2$: N, 7.03. Found: N (Dumas), 7.04.

Lustrous filaments and transparent, tough, pliable sheeting can be prepared from this polymer in the manner described under Example I. When conditioned for eighteen hours at 25° C. and 50% relative humidity, the filaments have tenacities of 0.8 grams/denier (1.9 grams/denier calculated on dimensions at break) with 235% elongation, and the sheeting has tensile strengths of 4800 lbs./sq. in. (13,000 lbs./sq. in. calculated on dimensions at break) with 440% elongation.

Example III

To 51.97 parts of hexamethylene glycol is added 74.25 parts of hexamethylene diisocyanate (B. P. 111°–112° C./4 mm.) in an atmosphere of dry nitrogen. The mixture is heated for twenty minutes at 100° C. with shaking to obtain a homogeneous solution. The solution solidifies during the heating at 100° C., and the polymer is then heated for 3.5 hours at 200° C. The polymer so prepared is a tough, white product which softens at 140° C. and melts at 150° C. The polymer has an intrinsic viscosity, as determined in m-cresol, of 0.60 and can be transformed into filaments and sheeting in the manner described under Example I. When conditioned for eighteen hours at 25° C. and 50% relative humidity, the filaments have tenacities of 0.6 grams/denier (2.6 grams/denier calculated on the dimensions at break) with 410% elongation, and the sheeting has tensile strength of 6000 lbs./sq. in. (8800 lbs./sq. in. calculated on the dimensions at break) with 165% elongation.

Example IV

To 37.43 parts of decamethylene glycol is added 36.65 parts of hexamethylene diisocyanate in an atmosphere of dry nitrogen. The mixture is heated for twenty minutes at 100° C. with shaking to obtain a homogeneous solution which is then heated for 3.5 hours at 200° C. The polymer so formed is a light-colored, hard, tough, gel, insoluble in hot m-cresol or any of the common organic solvents, softening at 235° C. and melting with decomposition at about 290° C. This polymer possesses slight fiber- and film-forming properties.

Example V

To 39.49 parts of hexamethylene diisocyanate is added 24.91 parts of di(β-hydroxyethyl) ether ($HOCH_2CH_2OCH_2CH_2OH$) in an atmosphere of dry nitrogen. The immiscible mixture is heated at 100° C. for thirty minutes during which time the two layers become miscible. The viscous polymer is then heated at 200° C. for three hours and at 250° C. for fifteen minutes. The resultant polymer when cooled to room temperature is a colorless, transparent brittle mass, melting at 120° C. and having an intrinsic viscosity, as determined in m-cresol, of 0.31. It is soluble hot in butanol-1, glacial acetic acid, and cyclohexanol. When molten, the polymer can be drawn out into a filament by touching with a cold rod and withdrawing the rod. These filaments have tensile strengths of 0.02 grams/denier calculated on the break dimensions.

Example VI

To 40.17 parts of meta-phenylene diisocyanate is added 27.62 parts of resorcinol in an atmosphere of dry nitrogen. The mixture is heated at 130° C. for five minutes, during which time the solids melt down to a homogeneous liquid which is heated at 150° C. for 1.5 hours and at 190° C. for three hours. Upon cooling, the polymer is an amber-colored, porous, brittle mass. The polymer has an intrinsic viscosity, as determined in m-cresol, of 0.06, is soluble in hot β-ethoxyethanol or ethylene chlorohydrin, softens at 190° C., and melts at 210° C. When molten, the polymer can be drawn into a filament by touching the molten mass with a cold rod and withdrawing the rod.

Example VII

To 43.31 parts of meta-phenylene diisocyanate is added 31.95 parts of hexamethylene glycol in an atmosphere of dry nitrogen. This mixture is heated at 100° C. for ten minutes, during which time the solids fuse to a homogeneous liquid which solidifies. This polymer is heated at 150° C. for six hours. When cooled, the resulting product is a colorless, porous, brittle mass, softening at 135° C., melting at 230° C., and having an intrinsic viscosity of 0.56 as determined in m-cresol. Filaments prepared by touching a cold rod to the molten polymer and withdrawing the rod have tenacities of 0.6 grams/denier calculated on the original dimensions or 0.8 grams/denier calculated on the break dimension.

*Example VIII*

To 77.07 parts of cyclohexanediol-1,4 is added 112.58 parts of hexamethylene diisocyanate in an atmosphere of dry nitrogen. The mixture is heated at 135° C. for twenty minutes, during which time complete fusion occurs with the formation of two layers. Agitation without further heating causes formation of a homogeneous solution followed immediately by solidification. This polymer is heated at 150° C. for sixteen hours and, when cooled, is a colorless, porous, brittle material, softening at 150° C. and melting at 210° C. It has an intrinsic viscosity, as determined in m-cresol, of 0.31 and, when molten, can be drawn into filaments by touching the melt with a cold rod and withdrawing the rod. Although the filaments can be cold drawn to an increase of a few per cent in length, they are somewhat brittle. The polymer is soluble hot in glacial acetic acid, ethylene chlorohydrin, and cyclohexanol.

*Example IX*

The following parallel preparations show that the production of polymeric carbamates can also be carried out in a solvent.

Decamethylene diisocyanate (123.47 parts) in 430 parts of anhydrous toluene is added dropwise with stirring to 95.95 parts of decamethylene glycol in 1300 parts of anhydrous refluxing toluene in an atmosphere of dry nitrogen. The addition is completed in twenty minutes, and refluxing is continued seven hours longer. After the toluene is removed by heating at 200° C. under 20 mm. pressure for forty-five minutes, a polymer is obtained having an intrinsic viscosity, as determined in m-cresol, of 0.15.

To 80.36 parts of decamethylene glycol is added 103.41 parts of decamethylene diisocyanate in an atmosphere of dry nitrogen. The mixture is heated in a vessel suspended in a bath of refluxing toluene vapors for twenty minutes during which time the mixture melts down to two layers which become miscible upon shaking. The solution solidifies within a few minutes. The polymer is then heated for seven hours at 111° C. and at 200° C. under 20 mm. pressure for forty-five minutes. The product so obtained has an intrinsic viscosity of 0.17 as determined in m-cresol.

*Example X*

To 12.70 parts of 2,2-di(4-hydroxyphenyl)propane

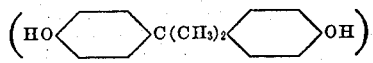

is added 12.48 parts of decamethylene diisocyanate in an atmosphere of dry nitrogen. The mixture is heated for two hours at 150°–170° C., during which time the reactants melt down to form a homogeneous solution which later solidifies. The polymerization is completed by heating for two hours at 200° C. The polymer so prepared is a hard, brittle, almost colorless, transparent product which softens at 70° C. and melts at 205° C. It can be transformed into brittle filaments in the manner described under Example I. The polymer is insoluble in all common organic solvents.

*Example XI*

To 17.98 parts of hexamethylenebis(glycolamide)

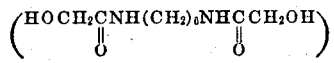

is added 17.36 parts of decamethylene diisocyanate in an atmosphere of dry nitrogen. The mixture is heated for two hours at 150°–170° C., during which time the reactants first melt down to form two immiscible layers. Upon agitation the layers form a homogeneous solution which soon solidifies. Polymerization is completed by heating for two hours at 200° C. The polymer so prepared is hard, light-brown, and opaque. It softens at 65° C. and melts at 130° C. The intrinsic viscosity of the product, as determined in m-cresol, is 0.14. The polymer is soluble in hot butanol-1, glacial acetic acid, β-ethoxyethanol, cyclohexanol, and in hot or cold ethylene chlorohydrin.

Anal. Calc'd. for $C_{22}H_{40}O_6N_2$: N, 12.28. Found: N (Dumas), 12.13.

*Example XII*

To 40.02 parts of 2,2-dimethyl-1,3-propanediol ($HOCH_2C(CH_3)_2CH_2OH$) is added 86.23 parts of decamethylene diisocyanate in an atmosphere of dry nitrogen. The mixture is heated for two hours at 150°–170° C., during which time the reactants melt down to form two immiscible layers. Upon agitation the layers form a homogeneous solution which soon solidifies. Polymerization is completed by heating for two hours at 200° C. The polymer so prepared is tough, transparent, light-yellow in color, and is insoluble in all common organic solvents.

Examples I to XII inclusive, illustrate the reaction of a diol with a diisocyanate. Example XIII illustrates the reaction of a dithiol with a diisocyanate.

*Example XIII*

To 20.17 parts of decamethylene dithiol

is added 21.91 parts of decamethylenediisocyanate in an atmosphere of dry nitrogen. The mixture is heated for two hours at 150°–170° C., during which time the reactants melt down to a homogeneous solution which then solidifies. Polymerization is completed by heating for two hours at 200° C. The polymer so prepared is hard, white, and opaque. It softens at 120° C. and melts at 130° C. The intrinsic viscosity of the polymer, as determined in m-cresol, is 0.35. The product is soluble in hot chlorobenzene or ethylene chlorohydrin.

Anal. Calc'd. for $C_{22}H_{42}O_2N_2S_2$: S, 14.89. Found: S, 14.29.

Examples XIV and XV illustrate the reaction of a diol with a diisothiocyanate.

*Example XIV*

To 60.54 parts of decamethylene glycol is added 69.57 parts of hexamethylene diisothiocyanate in an atmosphere of dry nitrogen. These, when heated at 125° C., form two immiscible layers which become a homogeneous solution within fifteen minutes. The reaction mixture is heated a total of one hour at 125° C. and three hours at 200° C. The polymer so formed is of a light reddish brown color and, at room temperature, is a firm, slightly rubbery resin. The polymer becomes moldable at 100° C., melts at 170° C., and has an intrinsic viscosity of 0.06, as determined in m-cresol solution. The product is soluble in hot phenols but insoluble in other common organic solvents.

Anal. Calc'd. for $C_{18}H_{34}O_2N_2S_2$: N, 7.48 Found: N (Dumas), 7.48.

Example XV

To 47.26 parts of hexamethylene glycol is added 80.16 parts of hexamethylene diisothiocyanate in an atmosphere of dry nitrogen. These, when heated at 125° C., form two immiscible layers which become a homogeneous solution within thirty minutes. The reaction mixture is heated a total of one hour at 125° C. and three hours at 200° C. The polymer so formed is a transparent, reddish brown resin, slightly rubbery at room temperature. The product becomes moldable at 50° C., melts at 205° C., and has an intrinsic viscosity of 0.08 as determined in m-cresol solution. The polymer is soluble in hot phenols but insoluble in other common organic solvents.

Anal. Calc'd. for $C_{14}H_{26}O_2N_2S_2$: N, 8.80. Found: N (Dumas), 9.01.

Example XVI illustrates the reaction of a dithiol with a diisothiocyanate.

Example XVI

To 66.70 parts of decamethylene dithiol $$(HS(CH_2)_{10}SH)$$

is added 64.72 parts of hexamethylene diisothiocyanate in an atmosphere of dry nitrogen. This solution is heated one hour at 125° C. and one hour at 200° C. The polymer so prepared is a brown resin, rubbery at room temperature. The product becomes moldable at 180° C., melts at 205° C., and has an intrinsic viscosity of 0.04 as determined in m-cresol solution. The polymer is soluble in hot phenols but insoluble in other common organic solvents.

Anal. Calc'd. for $C_{18}H_{34}N_2S_4$: N, 6.89. Found: N (Dumas), 6.89.

Example XVII illustrates the behavior of a linear polymeric carbamate on hydrolysis.

Example XVII

To 14 parts of polydecamethylene carbamate is added 360 parts of 37% aqueous hydrochloric acid. The mixture is heated under pressure for twenty-four hours at 150° C., during which time the polymer is completely hydrolyzed. The organic liquid on top is separated, the aqueous layer is extracted twice with 50 parts of benzene each time, and the benzene extracts are added to the organic liquid first removed. Removal of the benzene and distillation of the residue yields 6 parts of decamethylene glycol. The identity of the decamethylene glycol is established by preparation of the corresponding di(3,5-dinitrobenzoate), melting at 112°–114° C. either when pure or when mixed with known decamethylene bis(3,5-dinitrobenzoate).

The aqueous layer, after being extracted with benzene, is evaporated to dryness. The residue is recrystallized from alcohol, yielding 8 parts of decamethylenediamine dihydrochloride. This compound is identified by preparing the corresponding di(paratoluenesulfonamide) melting at 120°–125° C. either when pure or when mixed with known decamethylene bis(paratoluenesulfonamide).

The diisocyanates and diisothiocyanates in general are useful in the practice of this invention. The following are additional examples of these materials: polymethylene diisocyanates and diisothiocyanates, such as ethylene diisocyanate, trimethylene diisocyanate, tetramethylene diisocyanate, tetramethylene diisothiocyanate, etc.; alkylene diisocyanates and diisothiocyanates, such as propylene-1,2-diisocyanate, butylene-1,2 - diisocyanate, butylene - 1,3 - diisocyanate, butylene-2,3-diisocyanate, and butylene-1,3-diisothiocyanate; alkylidine diisocyanates and diisothiocyanates, such as ethylidene diisocyanate $(CH_3CH(NCO)_2)$, propylidene-1,1-diisocyanate $(CH_3CH_2CH(NCO)_2)$, propylidene-2,2-diisocyanate $(CH_2C(NCO)_2CH_3)$, and ethylidene diisothiocyanate $(CH_3CH(NCS)_2)$; cycloalkylene diisocyanates and diisothiocyanates, such as cyclopentylene-1,3-diisocyanate, cyclohexylene-1,2-diisocyanate, cyclohexylene-1,3-diisocyanate, cyclohexylene-1,4-diisocyanate, and cyclohexylene-1,2-diisothiocyanate; cycloalkylidene diisocyanates and diisothiocyanates, such as cyclopentylidene diisocyanate $((CH_2)_4C(NCO)_2)$, cyclohexylidene diisocyanate $((CH_2)_5C(NCO)_2)$ and cyclohexylidene diisothiocyanate $((CH_2)_5C(NCS)_2)$; aromatic diisocyanates and diisothiocyanates, such as o-phenylene diisocyanate, p-phenylene diisocyanate, 1-methyl-2,4-phenylene diisocyanate, naphthylene-1,4-diisocyanate, diphenylene-4,4'-diisocyanate, or p-phenylene diisothiocyanate; aliphatic-aromatic diisocyanates or diisothiocyanates, such as xylylene-1,4-diisocyanate

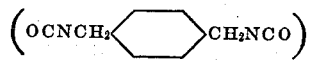

xylyene-1,3-diisocyanate

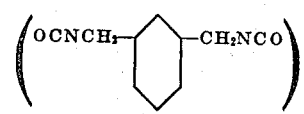

4,4'-diphenylenemethane diisocyanate

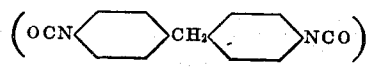

4,4-'diphenylenepropane diisocyanate

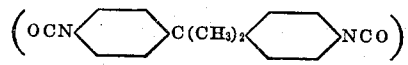

or xylylene-1,4-diisothiocyanate

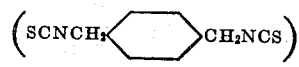

In fact, any diisocyanate or diisothiocyanate of the general formula XCNRNCX, in which X is oxygen or sulfur and R is a divalent organic radical not carrying a functional group or groups, other than the two isocyanate or isothiocyanate groups, which will react with an isocyanate or isothiocyanate group or a hydroxyl or thiol group under the conditions of polymer formation, will react with a wide variety of diols and dithiols to give polymeric carbamates and thiocarbamates.

The dihydric alcohols, dihydric phenols and dithiols mentioned in the above examples may be replaced by others of the numerous compounds of this kind, as for instance, by compounds having the general formula HXRXH where X is oxygen or sulfur and R is polymethylene, alkylene, cycloalkylene, aromatic, and aromatic-aliphatic. For example, the diols formed by replacing the isocyanate or isothiocyanate groups of the compounds in the preceding paragraph with hydroxyl or thiol groups would be equally suitable for reacting with diisocyanates and diisothiocyanates.

The polymerizations may be conducted either in the presence or absence of solvents or diluents, and in either open or sealed vessels. The reactions are preferably conducted in the absence of oxygen or moisture which may be accomplished either by operating in a partial vacuum or in the presence of an inert gas such as nitrogen. It has not been found necessary to operate above 250° C. Temperatures substantially below 90° C. are impracticable. In the preferred embodiment of this invention the heating of the reactants is continued until the polymer exhibits fiber-forming properties. This stage is easily determined by touching the molten polymer with a rod and drawing the rod away; if this stage has been reached, a continuous filament of considerable strength and pliability is readily formed. The filaments are further capable of being cold drawn, that is drawn by application of tensile stress in the solid state, into fibers exhibiting by X-ray examination molecular orientation along the fiber axis.

Although the preferred embodiment of this invention comprises heating the reactants until they exhibit fiber-forming properties, it is within the scope of this invention to discontinue heating before that stage is reached. The low molecular weight or non-fiber-forming polymers are useful for certain applications, e. g. molding compositions or adhesives. Lower molecular weight viscosity-stabilized polymers, capable of remaining unchanged under continued conditions of heating as in melt-spinning, film-pressing, or compounding, can be prepared by adding one reactant in excess of the chemically equivalent amount or by adding a small amount of a different glycol or a monohydric alcohol, or their sulfur analogues. Similarly, rather than an excess of the diisocyanate or diisothiocyanate being employed, a small amount of some other diisocyanate or diisothiocyanate, or a mono-isocyanate or isothiocyanate may be used.

The new polymers described herein are useful in the manufacture of fibers, textile products, textile finishing agents such as for improving the water-repellency of treated fabric, bristles, and coating and molding compositions. For these purposes the polymers may be used either alone or with plasticizers, resins, dyes, pigments, etc.

This invention permits the preparation of linear polymeric carbamates and thiocarbamates of high molecular weight which can be spun to fibers capable of being cold drawn. Tough, pliable, transparent film can be prepared from these polymers. This method of preparation permits the use of low or moderate temperatures in the formation of superpolymers and the preparation is free from the evolution of by-products.

As many apparently widely different embodiments of this invention may be made without departing from the spirit and scope thereof, it is to be understood that I do not limit myself to the specific embodiments thereof except as defined in the appended claims.

I claim:

1. A process for making synthetic linear polymers which comprises heating to reaction temperature substantially equimolecular proportions of a substance of the class consisting of bifunctional diisocyanates and diisothiocyanates, and a bifunctional diol of the class consisting of dihydric alcohols, dihydric phenols, and dithiols.

2. A process for making fiber-forming polymers which comprises heating to reaction temperature in substantially equimolecular amounts a substance of the class consisting of bifunctional diisocyanates and diisothiocyanates, and a bifunctional diol of the class consisting of dihydric alcohols, dihydric phenols, and dithiols, and continuing the heating until continuous filaments can be formed which are capable of being cold drawn into fibers exhibiting molecular orientation upon X-ray examination.

3. A linear polymer comprising essentially structural units of the formula

in which R and R' are free from functional groups and are divalent organic radicals and X is a member of the class consisting of oxygen and sulfur.

4. A linear polymer comprising essentially structural units of the formula

in which R and R' are free from functional groups and are divalent organic radicals and X is a member of the class consisting of oxygen and sulfur, said polymer being capable of being formed into filaments which can be cold drawn into fibers exhibiting upon X-ray examination molecular orientation along the fiber axis.

5. A linear polymer in the form of a pliable fiber which comprises essentially structural units of the formula

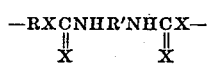

in which R and R' are free from functional groups and are divalent organic radicals and X is a member of the class consisting of oxygen and sulfur, said fiber exhibiting upon X-ray examination orientation along the fiber axis.

6. A linear polymer which on hydrolysis with concentrated hydrochloric acid yields a bifunctional compound of the class consisting of diols and dithiols, a diamine hydrochloride, and a substance of the class consisting of $CO_2$ and $CS_2$.

7. A process for making linear polymers which comprises heating under oxygen free conditions at 90° C. to 250° C. equimolecular proportions of a substance of the class consisting of bifunctional diisocyanates and diisothiocyanates, and a bifunctional diol of the class consisting of dihydric alcohols, dihydric phenols, and dithiols, and continuing the heating until the resulting polymer has an intrinsic viscosity above 0.2.

8. A process for making viscosity stable linear polymer which comprises heating to reaction temperature in the presence of a monohydric alcohol substantially equimolecular proportions of a substance of the class consisting of bifunctional diisocyanates and diisothiocyanates, and a bifunctional diol of the class consisting of dihydric alcohols, dihydric phenols, and dithiols.

9. An article of manufacture comprising essentially structural units of the formula $$-RXCNHR'NHCX-$$
$$\phantom{-RX}\|\phantom{CNHR'NH}\|$$
$$\phantom{-RX}X\phantom{CNHR'NH}X$$

in which R and R' are free from functional groups and are divalent organic radicals and X is a member of the class consisting of oxygen and sulfur.

10. A filament comprising a linear polymer which comprises essentially structural units of the formula defined in claim 9.

11. A film comprising a linear polymer which comprises essentially structural units of the formula defined in claim 9.

12. A linear polymer comprising essentially structural units of the formula $$-ROCNHR'NHCO-$$
$$\phantom{-RO}\|\phantom{CNHR'NH}\|$$
$$\phantom{-RO}O\phantom{CNHR'NH}O$$

in which R and R' are divalent hydrocarbon radicals.

13. A linear polymer comprising essentially structural units of the formula $$-ROCNHR'NHCO-$$
$$\phantom{-RO}\|\phantom{CNHR'NH}\|$$
$$\phantom{-RO}S\phantom{CNHR'NH}S$$

in which R and R' are divalent hydrocarbon radicals.

WILLARD E. CATLIN.

Disclaimer 2,284,637.—*Willard E. Catlin*, Wilmington, Del. POLYMERIC CARBAMATES AND THEIR PREPARATION. Patent dated June 2, 1942. Disclaimer filed Mar. 17, 1950, by the assignee, *E. I. du Pont de Nemours and Company*.

Hereby enters this disclaimer to claim 12 of said patent.

[*Official Gazette April 18, 1950.*]